Figure 1:
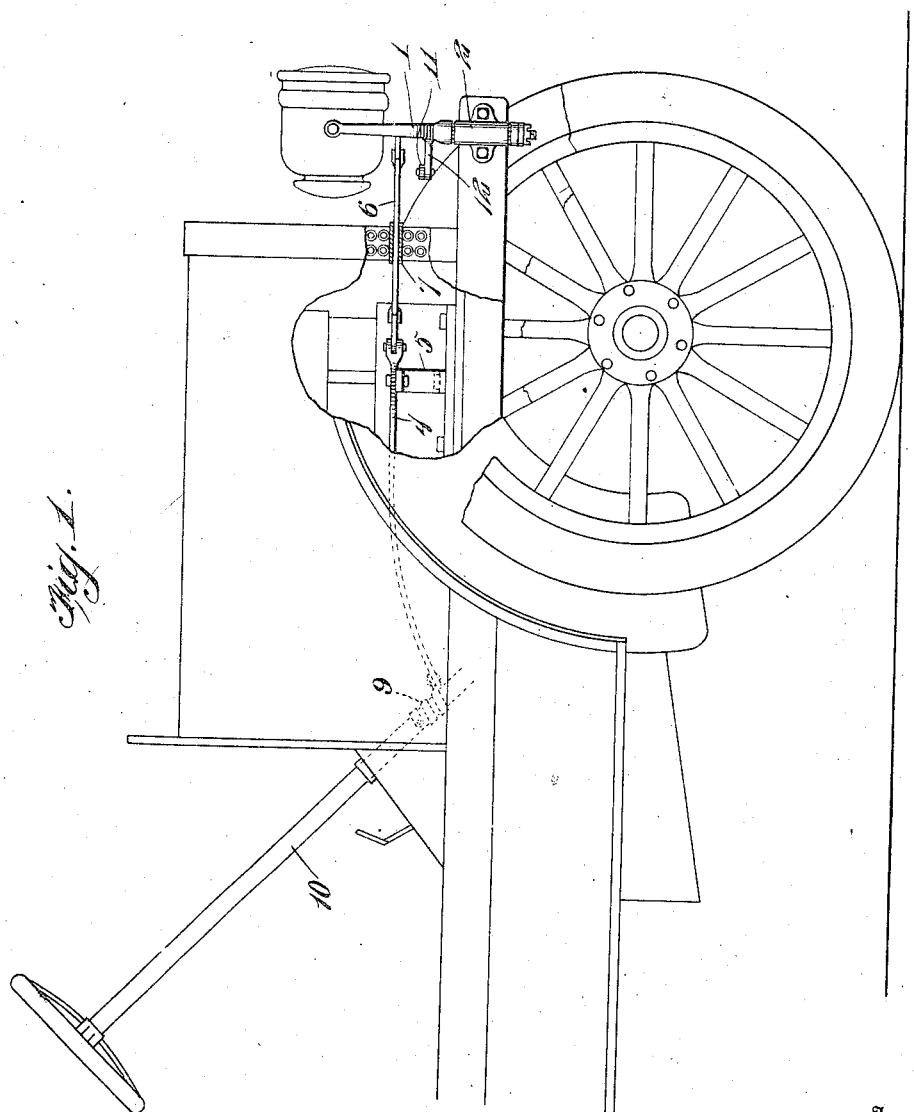

B. D. LAKE & N. G. MARKS.
AUTOMOBILE LIGHT CONTROLLING DEVICE.
APPLICATION FILED AUG. 28, 1912.

1,061,087.

Patented May 6, 1913.
2 SHEETS—SHEET 1.

Witnesses
J. Rudolf Heinrichs
V. B. Hillyard

Inventors
Benjamin D. Lake
Nathaniel G. Marks
By Victor J. Evans
Attorney

B. D. LAKE & N. G. MARKS.
AUTOMOBILE LIGHT CONTROLLING DEVICE.
APPLICATION FILED AUG. 28, 1912.
1,061,087.
Patented May 6, 1913.
2 SHEETS—SHEET 2.
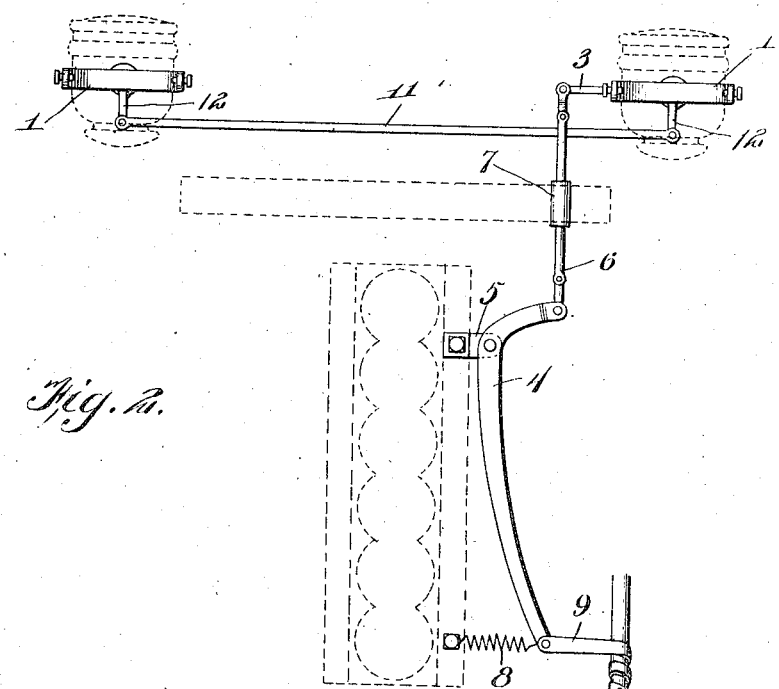
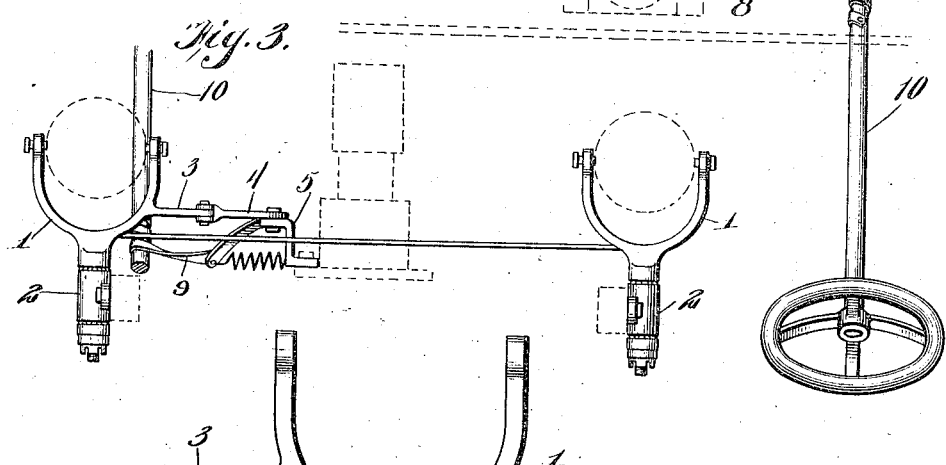
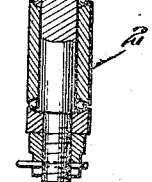
Witnesses
S. Rudolf Heinrichs
U. B. Hillyard
Inventors
Benjamin D. Lake
Nathaniel G. Marks
By Victor J. Evans
Attorney

UNITED STATES PATENT OFFICE.

BENJAMIN D. LAKE AND NATHANIEL G. MARKS, OF SPRINGFIELD, KENTUCKY.

AUTOMOBILE LIGHT-CONTROLLING DEVICE.

1,061,087.  Specification of Letters Patent.  Patented May 6, 1913.

Application filed August 28, 1912. Serial No. 717,553.

*To all whom it may concern:*

Be it known that we, BENJAMIN D. LAKE and NATHANIEL G. MARKS, citizens of the United States, residing at Springfield, in the county of Washington and State of Kentucky, have invented new and useful Improvements in Automobile Light-Controlling Devices, of which the following is a specification.

This invention has relation to headlights for automobiles, kindred machines and vehicles whereby the light may be directed in the path of the machine whether the travel is straight ahead, around a curve or turning a corner, thereby enabling the operator to observe the roadway at such a distance ahead as to avoid an accident.

The invention consists in having the headlight mounted so as to turn about a vertical axis and having connecting means between such headlight and the steering mechanism so that movement of the steering wheels will produce a corresponding movement of the headlight to cause the rays of light to illuminate the roadway ahead of the machine whether on a straight course, rounding a curve or turning a corner.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a fragmentary view in elevation of an automobile, showing the headlight mounted in accordance with this invention. Fig. 2 is a detail plan view. Fig. 3 is a front view. Fig. 4 is a detail view of a lamp support, showing more clearly the mountings thereof.

Corresponding and like parts are referred to in the following description, and indicated in all the views of the drawings, by the same reference characters.

The lamp support 1 is of usual form comprising a stem and a fork and is mounted by means of the stem in a sleeve 2, which is secured to the side bar of the frame in substantially the same manner as the ordinary lamp support. In order to admit of the lamp support turning freely ball bearings are provided between the sleeve 2 and the stem of the fork. An arm 3 projects laterally from one of the fork members. An elbow lever 4 is pivoted to the arm of a bracket 5, which is secured to the engine frame or other convenient part of the machine. The short arm of the elbow lever extends laterally, whereas the long arm is arranged lengthwise of the machine. A rod 6 connects the short arm of the elbow lever with the arm 3 of the lamp support and passes through a guide 7 fitted to the radiator or other part of the machine. The long arm of the elbow lever 4 is connected to the frame of the engine or machine by means of a contractile helical spring 8. A flexible connection 9 has one end attached to the long arm of the lever 4 and is wrapped about the steering post 10 and has its opposite end secured thereto.

The parts are so proportioned and arranged that when the machine is traveling straight ahead the lamp is held in such position as to throw the rays of light in advance of the machine. Upon turning the steering post to wind up the flexible connection 9 the spring 8 is stretched and the lamp is turned so as to throw the rays of light in the path of the machine when turning. Upon turning the steering post 10 to unwind the flexible connection 9 the spring 8 contracting moves the lever 4 and the lamp in an opposite direction to illuminate the roadway in advance of the machine when turning in an opposite direction. The flexible connection 9 is kept under tension at all times by means of the spring 8. The lamp support upon one side of the machine is connected with the lamp support on the opposite side of the machine by means of a rod 11, which has its ends attached to the short arms 12 projecting from the lamp supports.

From the foregoing description, taken in connection with the accompanying drawings, the advantages of the construction and of the method of operation will be readily apparent to those skilled in the art to which the invention appertains, and while we have described the principle of operation of the invention, together with the device which we now consider to be the best embodiment thereof, we desire to have it understood that the device shown is merely illustrative and that such changes may be made when desired as are within the scope of the claims appended hereto.

Having thus described the invention what is claimed as new, is:—

1. In combination with the main frame of a machine or vehicle, a headlight mounted on such frame and free to turn about a vertical axis, a steering post, an elbow lever having arms of different lengths pivoted to said frame with the short arm projecting laterally and the long arm extending lengthwise of the frame, a flexible connection attached at one end to the long arm of the elbow lever and having its opposite end portion wound around the steering post, a contractile spring connecting the long arm of the elbow lever with the main frame, and connecting means between the short arm of the elbow lever and the headlight.

2. In combination a main frame of a machine or vehicle, headlight supports mounted at opposite sides of the main frame to turn about vertical axes, arms projecting from the headlight supports, a rod connecting such arms, an elbow lever pivoted to the main frame and having one arm projecting laterally and its other arm extending lengthwise of the frame, a second arm projecting from one of the headlight supports, a rod connecting such second arm with the lateral arm of the elbow lever, a steering post, a flexible connection between the steering post and the longitudinal arm of the elbow lever, and a contractile spring between the frame and longitudinal arm of the lever.

In testimony whereof we affix our signatures in presence of two witnesses.

BENJAMIN D. LAKE.
NATHANIEL G. MARKS.

Witnesses:
  W. F. TRUSTY,
  L. B. CAIN.